United States Patent [19]

Watanabe et al.

[11] 4,166,098
[45] Aug. 28, 1979

[54] PROCESS FOR TREATING AN ACID WASTE LIQUID

[75] Inventors: Morio Watanabe, Amagasaki; Sanji Nishimura, Kyoto, both of Japan

[73] Assignee: Solex Research Corp. of Japan, Osaka, Japan

[21] Appl. No.: 820,258

[22] Filed: Jul. 29, 1977

Related U.S. Application Data

[63] Continuation of Ser. No. 659,355, Feb. 19, 1976, abandoned.

[30] Foreign Application Priority Data

Mar. 14, 1975 [JP] Japan .............................. 50/031550
Jul. 21, 1975 [JP] Japan .............................. 50/089433

[51] Int. Cl.$^2$ ........................ C01B 7/22; C01G 49/10; C01B 21/46
[52] U.S. Cl. .................................. 423/139; 423/390; 423/484; 423/DIG. 1; 134/10
[58] Field of Search ............... 423/139, 321 S, 390 R, 423/390 P, 476, 481, 531, 658.5, 488, DIG. 1, DIG. 2, DIG. 14, 484; 134/3, 10, 13

[56] References Cited

U.S. PATENT DOCUMENTS

| | | | |
|---|---|---|---|
| 2,880,063 | 3/1959 | Baniel et al. | 423/321 S |
| 3,145,081 | 8/1964 | Surls et al. | 423/112 |
| 3,211,521 | 10/1965 | George et al. | 423/139 |
| 3,497,330 | 2/1970 | Baniel et al. | 423/321 S |
| 3,588,476 | 6/1971 | Beutner et al. | 423/139 |
| 3,870,060 | 3/1975 | Liljenziu et al. | 423/488 |
| 3,972,982 | 8/1976 | Centofanti | 423/488 |

OTHER PUBLICATIONS

Habashi, *Extractive Metallurgy*, vol. 2, Gordon and Breach, N.Y. (1970), pp. 175, 176.
Marcus et al. *Ion Exchange and Solvent Extraction of Metal Complexes*, Wiley-Interscience Ltd., 1969, p. 675.

*Primary Examiner*—Brian Hearn
*Attorney, Agent, or Firm*—Toren, McGeady and Stanger

[57] ABSTRACT

A process for treating an acid waste liquid containing Fe ions which has been used for acid washing of metallic materials or articles, comprising the first stage where an organic solvent (A) is added to the acid waste liquid to extract Fe ions, the second stage where an acid is added to the resulting acid waste liquid to convert chemical species of remaining metal salts and increase the hydrogen ion concentration followed by addition of an organic solvent (B) to recover the mineral acid of concern by extraction, the third stage where an organic solvent (C) is added to the resulting acid waste liquid to extract and recover other required mineral acids, and regenerating each of the organic solvents (A), (B) and (C) in respective stages.

9 Claims, 17 Drawing Figures

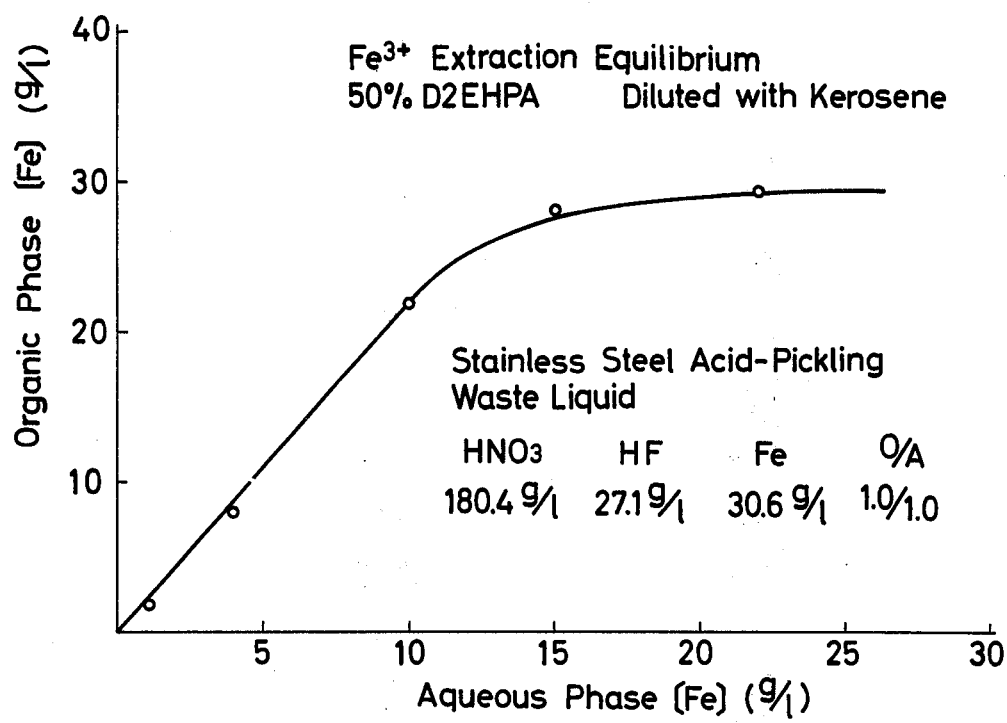
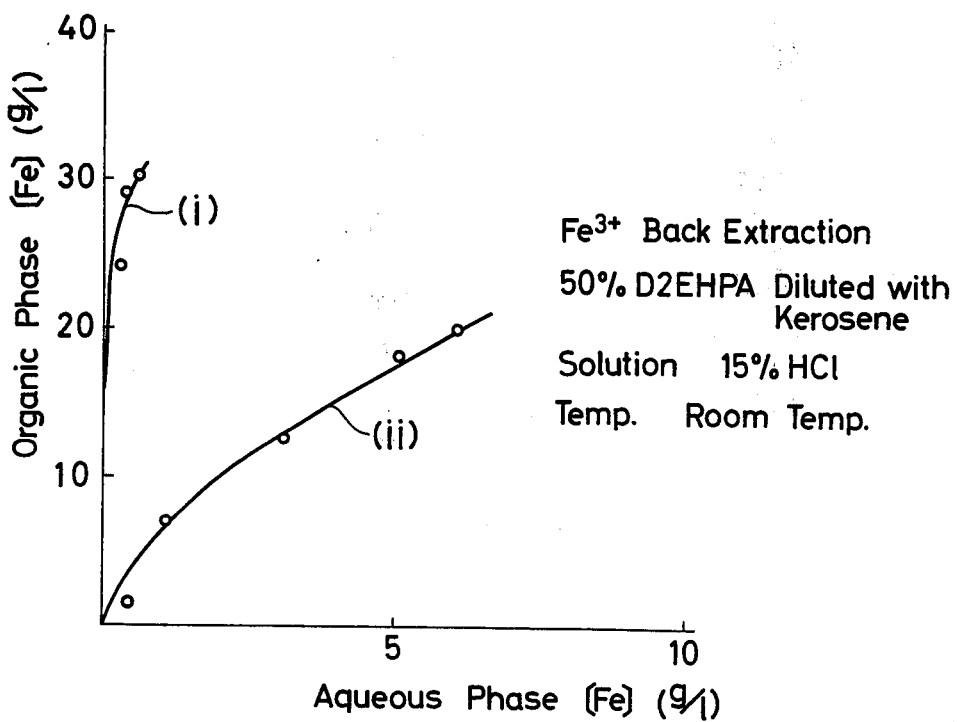

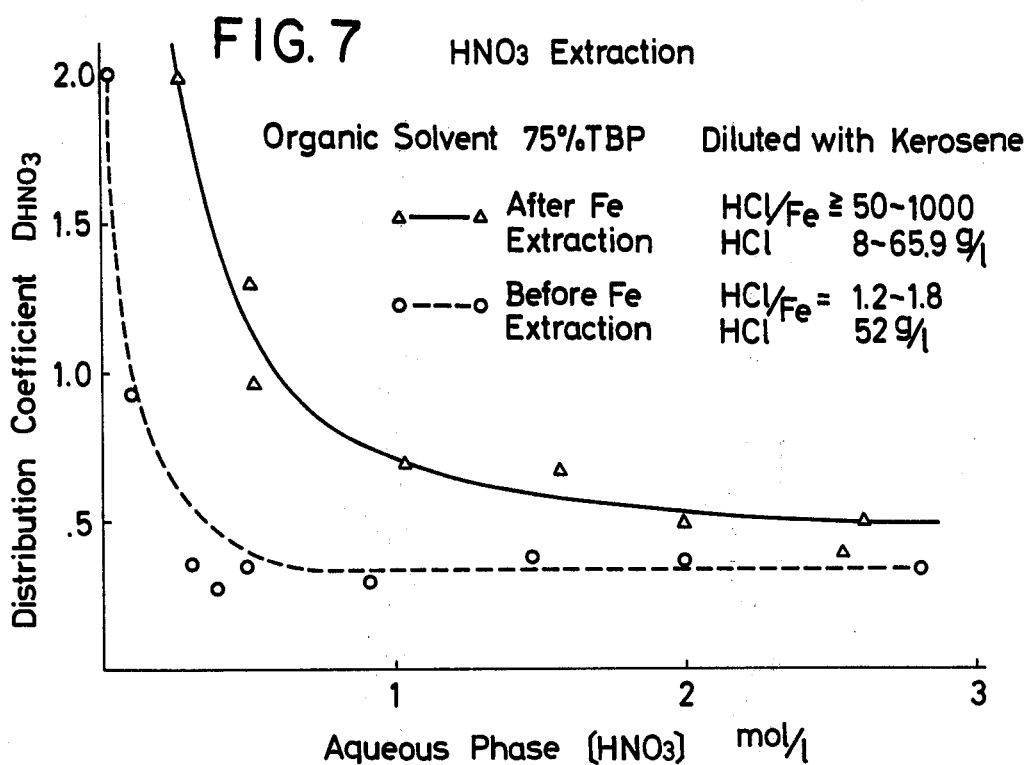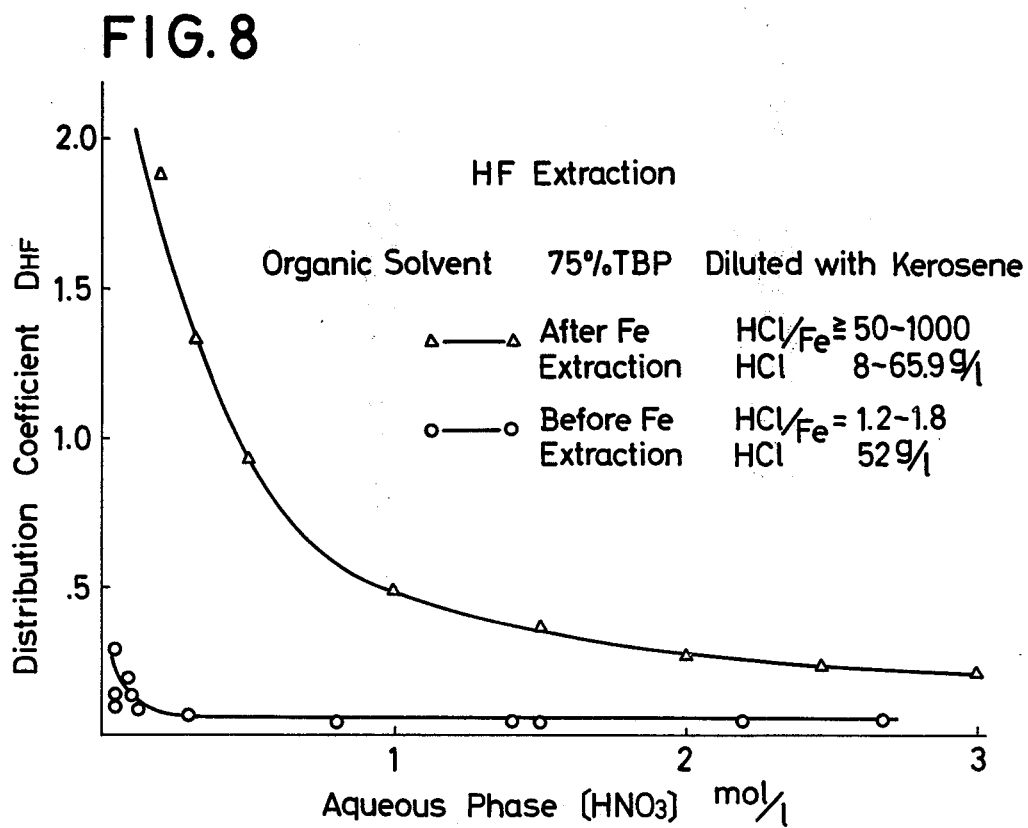

HF Extraction
75% TBP Diluted with Kerosene
$Me^{++}$ 37.4 g/l
HCl 63.2 g/l

HF Back-Extraction

75% TBP Diluted with Kerosene
Temp. 60°C

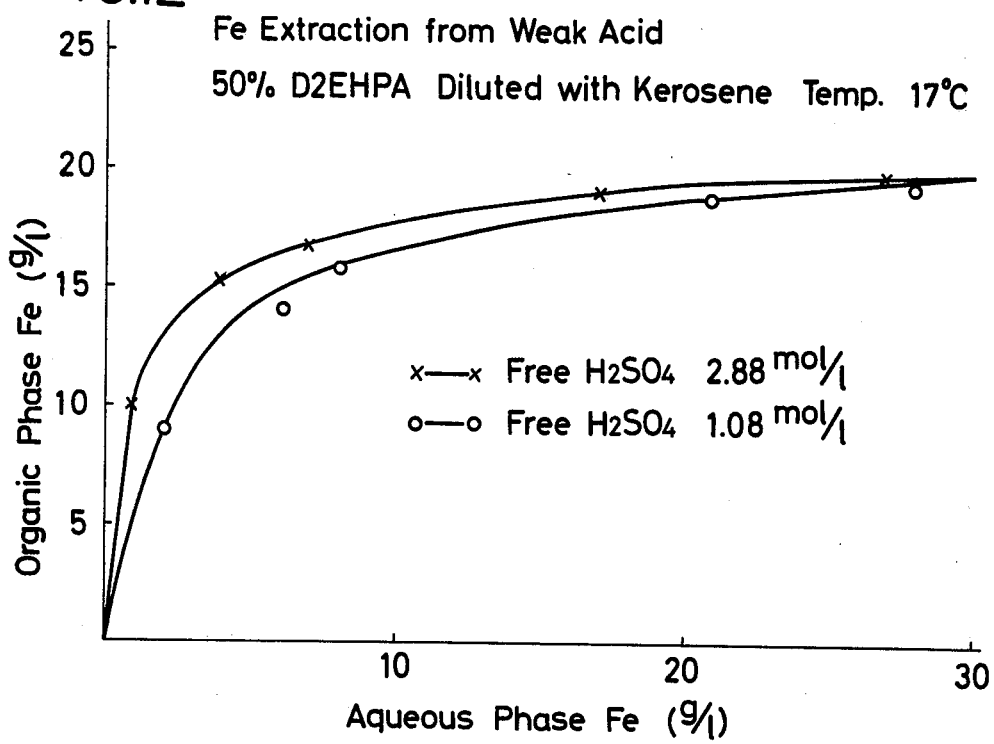
FIG.12 — Fe Extraction from Weak Acid, 50% D2EHPA Diluted with Kerosene, Temp. 17°C
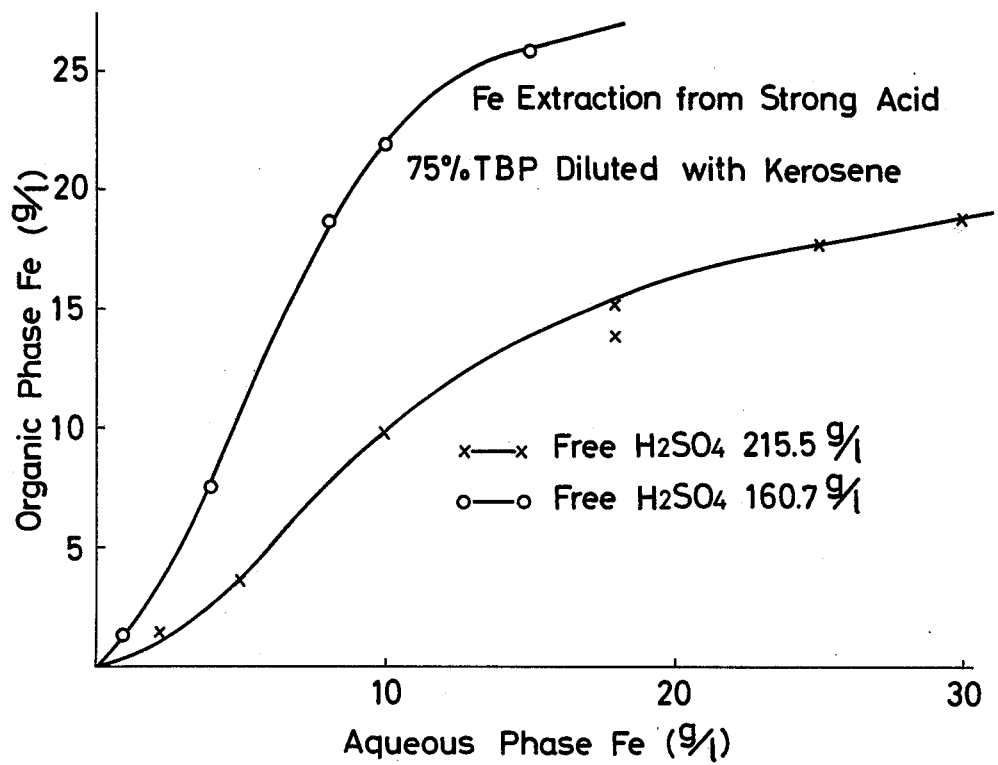
FIG.13 — Fe Extraction from Strong Acid, 75% TBP Diluted with Kerosene

PROCESS FOR TREATING AN ACID WASTE LIQUID

This is a continuation of application Ser. No. 659,355, filed Feb. 19, 1976, now abandoned.

BACKGROUND OF THE INVENTION

Previously various processes have been developed for treating acid waste liquid for use for metallic materials and articles, for example an acid pickling waste solution of stainless steel, as disclosed in Japanese Patent Application Laid-open Specification Sho No. 48-83097. According to this process, a univalent inorganic acid is removed from an aqueous solution which contains metallic salts of the said univalent inorganic acid. For that purpose, the sulfuric acid content of the solution is adjusted so that the content is at least equivalent to that of the metals, then the solution is brought into contact with an organic solution of a compound which is capable of forming an adduct with the said inorganic acid, to extract the inorganic acid in the organic phase. More particularly, in treating an acid waste liquid which has been used for acid pickling of stainless steels or acid-resistant steels, that amount of sulfuric acid equivalent to the metal contained in the solution is added, then extraction is conducted using an organic phase consisting of 25% kerosene and 75% tributyl phosphate, and finally the acid in the organic phase is stripped with water and returned to the acid washing bath. Remaining acid and molybdenum and other metals are in the outgoing organic phase from the stripping stage washed with a solution of sodium hydroxide. The organic phase is circulated to and used in the extraction stage.

However, the previous process mentioned above has several disadvantages; low recovery of acid, for example hydrofluric acid, which is combined with Fe, low distribution ratio of $HNO_3$ and HF, large scale installation, increased amount of sludge due to formation of $CaF_2$ and $CaSO_4.2H_2O$, if the solution is neutralized with $Ca(OH)_2$ after the acid has been recovered, high recovering cost of valuable metals like Ni, Cr and Mo by smelting owing to low quality grade of them in the sludge, and coextraction of $FeCl_3$ as shown in FIGS. 14 and 15 with $HNO_3$ and HF when hydrochloric acid is used in place of sulfuric acid in order to adjust the hydrogen ion concentration.

SUMMARY OF THE INVENTION

The present invention has overcome the difficulties of the conventional process as mentioned above, and provides a process for treating acid waste liquids which have been used for acid pickling of metallic materials or articles and for fractionally recovering the mineral acid. Further this invention aims to effectively regenerate the organic solvents which have been used for treating acid waste liquids and also to effectively recover the Fe which has been extracted during the treatment.

More particularly, according to the present invention, an organic solvent (A) is added in the 1st stage to extract and recover Fe in the acid waste liquid into an organic phase; hydrochloric acid is added to the resulting waste liquid not including Fe ions in the 2nd stage to yield extractable undissociated acids (HF and $HNO_3$) by replacing some of the $NO_3^-$ and $F^-$ in the remaining metal salts with $Cl^-$ and increase the hydrogen ion concentration. Then an organic solvent (B) is added to extract and recover desired mineral acids; and in the 3rd stage an organic solvent (C) is added to the waste liquid which has been treated in the 2nd stage, to extract and recover other desired mineral acids; while organic solvents (A), (B) and (C) are regenerated in the respective stages.

After Fe ions present abundantly in the acid waste liquid are converted into $Fe^{3+}$, the organic solvent (A) described above is applied to extract the Fe ions into the organic phase and to recover acid in the waste liquid. The extracted Fe ions in the organic phase are weakly reduced by contacting with a solution containing reducing agents, such as $Na_2SO_4$, $Na_2So_4$, NaCl $NaNo_2$ and $N_2H_4$, so as to make back-extraction possible. The Fe in the back-extraction solution is recovered by electrolysis in the form of metallic iron. Thus Fe ions and acids are recovered from the acid waste liquid containing Fe ions.

DETAILED EXPLANATION OF THE INVENTION

The present invention wll be explained in detail with reference to drawings.

FIG. 3 is a graph showing Fe extraction equilibrium curve in the first stage.

FIG 4 is a graph showing Fe back-extraction equilibrium curve in the first stage.

FIG. 7 shows a graph comparing $HNO_3$ extraction before Fe extraction and after Fe extraction.

FIG. 8 shows a graph comparing HF extraction before Fe extraction and after Fe extraction.

FIG. 12 is a graph showing Fe extraction equilibrium in a weak acid solution in the sulfuric acid regeneration stage.

FIG. 13 is a graph showing Fe extraction equilibrium in a strong acid solution in the sulfuric acid regeneration stage.

Figure 1:
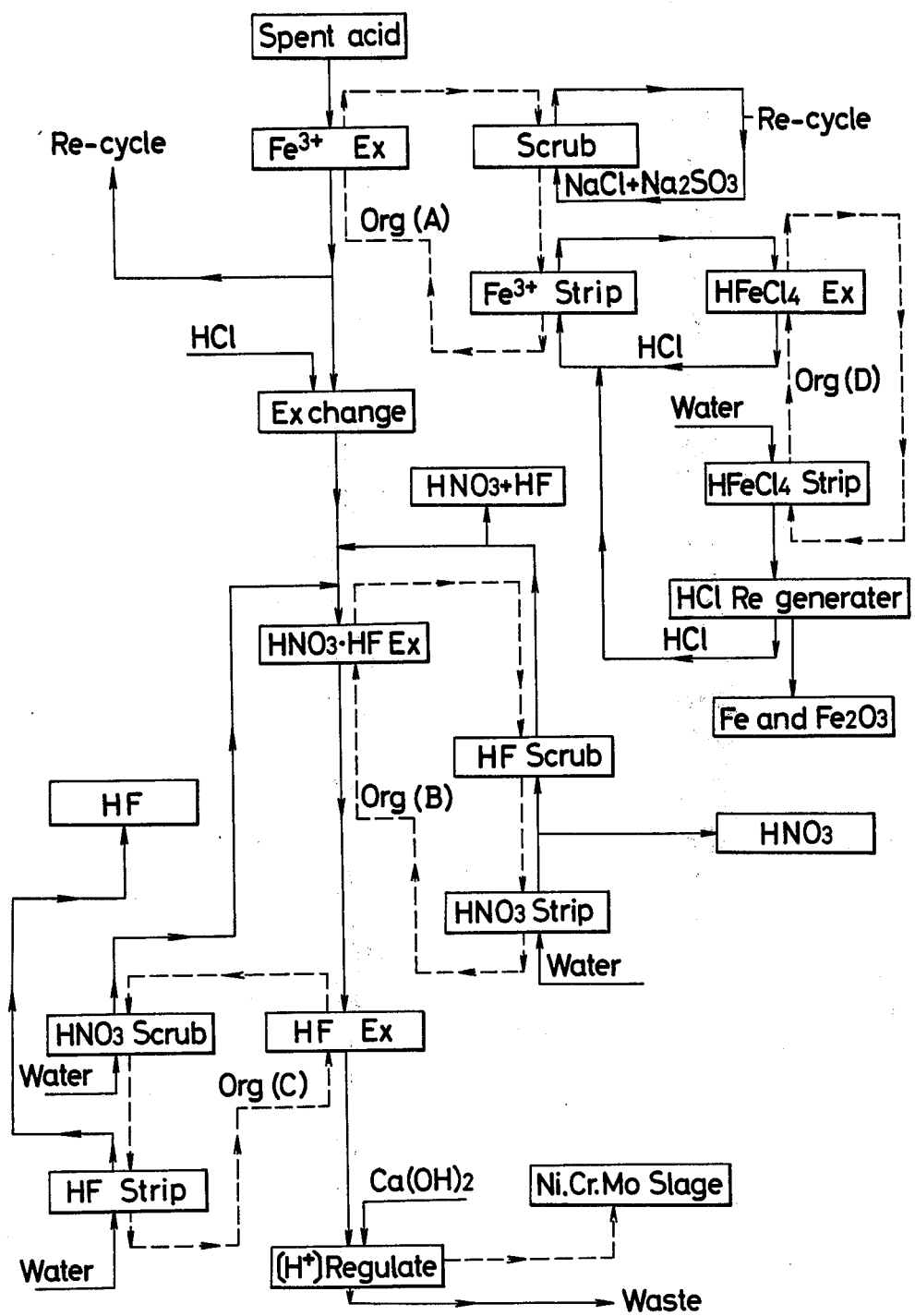
FIG. 1 and FIG. 2 show a general flow-sheet of the present invention.
Figure 2:
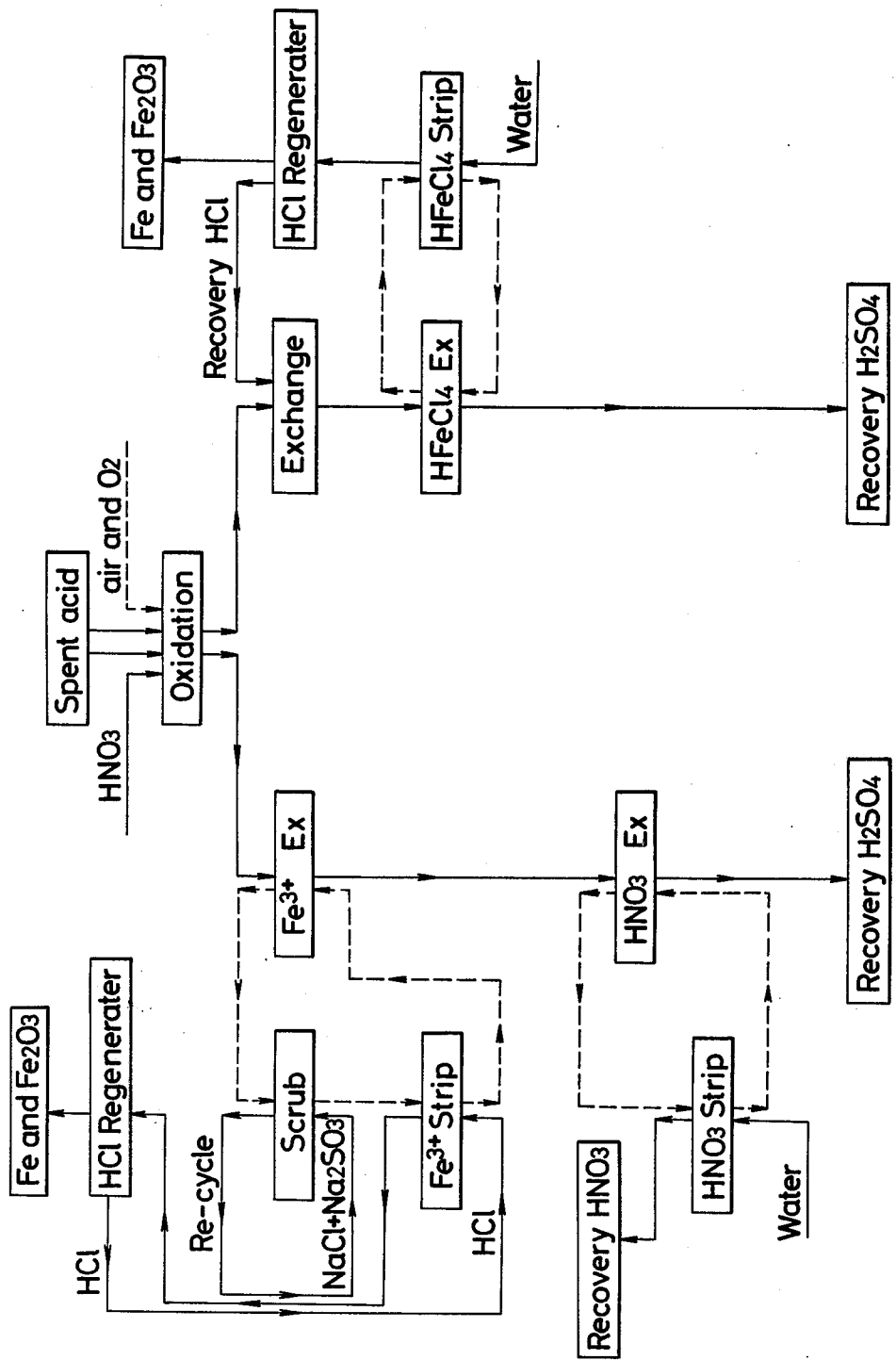

In the first stage of extraction, an acid waste liquid (W) which has been used for acid pickling of metallic materials or articles, containing a large amount of heavy metal ions is brought into contact and mixed with a solution (A) of dialkyl phosphoric acid such as $D_2EHPA$ (diethyl hexyl phosphoric acid) and $H_2DBP$ or a mixture thereof with a lesser amount of a carboxylic acid in an organic solvent containing active H atoms, where the compounds are selected as most suitable to react with the most abundant Fe ions, to extract the Fe ions into the organic phase by the ion exchange of Fe ions with H ions, and consequently the monovalent anions which have been combined with Fe are liberated as extractable corresponding free acid, resulting in the improved extractability of mineral acids in the stage of extraction that follows. The reaction involved can be expressed by the following equations:

$$Fe^{3+} + 3((RO_2)_2POOH) \rightarrow Fe((RO_2)_2PO_2) + 3H^+$$
(see FIG. 3)

Further, the Fe ions extracted in the organic phase are in the scrubbing stage brought into contact and mixed with a solution containing reducing agents, such as 2 M NaCl solution, 2 M NaCl+0.1 M $Na_2SO_3$ solution, 1 M NaCl+0.05 M $NaNo_2$ solution, and solutions containing a small amount of $N_2H_4$, so as to faciliate the back-extraction of Fe ion in the subsequent stripping step as seen in FIG. 4 and then contacted with a stripping solution such as HCl solution to obtain a solution of high Fe concentration and regenerate the organic solvent (A) according to the formula:

$$Fe[(RO_2)_2PO_2]_3 + 3\ HCl \longrightarrow 3[(RO_2)_2PO_2H] + FeCl_3$$
(org.)　　　(aq.)　　　　　(org.)　　　(aq.)

In the stage of electrolysis that follows, iron is recovered from the stripping solution and the solution itself is regenerated for further use and Fe is recovered as electrolytic iron or iron oxides (see FIG. 4).

Also as shown in FIG. 4, in case when the Fe ion concentration in the stripping solution is low, the solution is brought into contact with an organic solvent (D) containing phosphoric acid ester such as TBP, TOP, DBBP and TOPO, or an organic solvent containing primary, secondary, tertiary or quaternary amine, for example, "Primene" (tradename, primary amine produced by Röhm und Haas, "Amberlite" (tradename, secondary amine produced by Röhm und Haas), "Alamine" (tradename tertiary amine produced by General Mills and "Aliquat" (tradename quaternary amine produced by General Mills.) so as to extract Fe as a complex compound according to the under formula and the Fe complex compound is returned to the back-extraction step.

$$FeCl_3 + HCl + 2TBP \longrightarrow$$
(aq.)　　　　(org.)
　　　　　　　$HFeCl_4 . 2TBP$ (extraction by phosphoric acid ester)
　　　　　　　(org.)

$$HCl + R_3N \longrightarrow (R_3N . H)^+Cl^-$$

$$FeCl_3 + R_3NH . Cl^- \longrightarrow$$
　　　　　　　$(R_3NH)^+FeCl_4^-$ (extraction by amine)

Fe extracted in the organic phase is contacted with water to strip it from the organic solvent (D) (see FIG. 4) and to obtain $FeCl_3.HCl$ solution of high concentration which is passed to the Fe—HCl recovering step.

On the other hand, HCl is added to the acid waste liquid, from which Fe ions have been removed, in such an amount as to be enough to convert the remaining heavy metal ions into different chemical species and to increase the hydrogen ion concentration for the purpose to make easy the extraction of the desired mineral acid. Then, in the second stage of extraction, the mixture thus formed is brought into contact and mixed with an organic solvent (B) containing a phosphoric acid ester such as TBP (tributyl phosphate), TOPO and TOP and primary, secondary and tertiary amines and quarternary ammonium chloride type solvents, to form adducts of the mineral acid such as $HNO_3$ and HF and extract the said acid into the organic phase, separating them from the acid waste. The reaction can be expressed by the following equation:

$$FeCl_3 + HCl + 2TBP \rightarrow HFeCl_4.2TBP\ complex$$

The extraction of $HNO_3$ and HF in the second step is remarkably different when Fe ion is present and when Fe ion is not present as seen in FIGS. 7,8. In this point, the present invention has a remarkable feature.

The extraction by the organic solvent (B) is performed in the order of $$HNO_3 > HFeCl_4 > > HF > HCl$$

so that in the Japanese Patent Application Laid-open Specification Sho No. 48-83097, $H_2SO_4$ is added to prevent formation of $FeCl_3$ for extraction of HF.

According to the present invention, Fe ion is extracted in the first extraction step, even when HCl is used, there is caused no formation of $FeCl_3$. HCl is easier to strip as compared with $H_2SO_4$ and addition of HCl in a stoichimetry amount is enough (in case of $H_2SO_4$ at least 1.2 times of stoichimetry amount is required).

Although the price of HCl is about four times higher than that of $H_2SO_4$, $CaCO_3$ or $Ca(OH)_2$ can be used in the neutralization after the extraction $HNO_3$ and HF, so that the neutralization cost is saved.

Following equations illustrate the processes of neutralization.

$$2HF + Ca(OH)_2 \rightleftharpoons CaF_2 + 2H_2O$$
(aq.)　(solid)　　　　(solid)　(aq.)

$$2HCl + Ca(OH)_2 \rightleftharpoons CaCl_2 + 2H_2O$$
(aq.)　(solid)　　　　(aq.)　(aq.)

When $H_2SO_4$ is used in place of HCl, $$H_2SO_4 + Ca(OH)_2 \longrightarrow CaSO_4 + 2H_2O$$
(aq.)　　(solid)　　　　(solid)　(aq.)

a sludge of $CaSO_4$ is formed owing to low solubility of the compound, which requires additional costly treatment. While recovery cost of metals in the sludge by smelting increases as quality grade of the co-precipitated metal hydroxides decreases. If HCl is used for the same purpose, $CaCl_2$ has a high solubility, sludge consists of only the metal hydroxides not including the Ca. Thus recovery of metals from the precipitated metal hydroxides by smelting will be easy and has a significant advantage in comparison with $H_2SO_4$ process.

In the process of the Japanese Patent Application Laid-open Specification Sho No. 48-83097, $Ca(OH)_2$ is first added to the amount equivalent to that of $F^-$ and then NaOH is used for neutralization, but this process introduces further increased cost because NaOH is 10 times expensive than $Ca(OH)_2$.

In the present invention, removing Fe ions in the first step, extractable free HF is formed from F⁻ combined with Fe ion in Fe metal complex and H⁺ in the aqueous solution, and HF is almost completely extracted in the second exit action stage. Therefore, $CaF_2$ sludge can not be formed in the neutralization stage. Little corrosion of apparatus or the second public pollution occurs because an amount of F gas generated in the smelting process is diminished and the cost is reduced consequently. Also metal values such as Ni and Cr are increased in the metal hydroxides, thus lowering the metal recovery cost by smelting.

Organic solvents (B) are phosphoric acid esters, including TBP, TOP and TOPO. TBP is typical among them. They are used in the concentration range, 50–75% and are diluted mostly with kerosene. A lower temperature favors the extraction slightly, but not much. The volume ratio of the two solutions is determined by the concentrations of the mineral acid of concern in the acid waste and of TBP in the organic solution. In general a multistage extraction, up to 6–10 stages, is necessary.

The mineral acids extracted in the organic phase, such as HF and $HNO_3$, are separated in the scrubbing stage from coextracts merely by scrubbing with the recovered acid solution (a solution with a large distribution ratio in extraction such as $HNO_3$) and can be recovered as reusable in the stripping stage by the contact and mixing with water, together with regeneration of the organic solvent (B). By this scrubbing, HF is scrubbed from the organic phase, leaving only $HNO_3$ in the organic phase.

Figure 9:
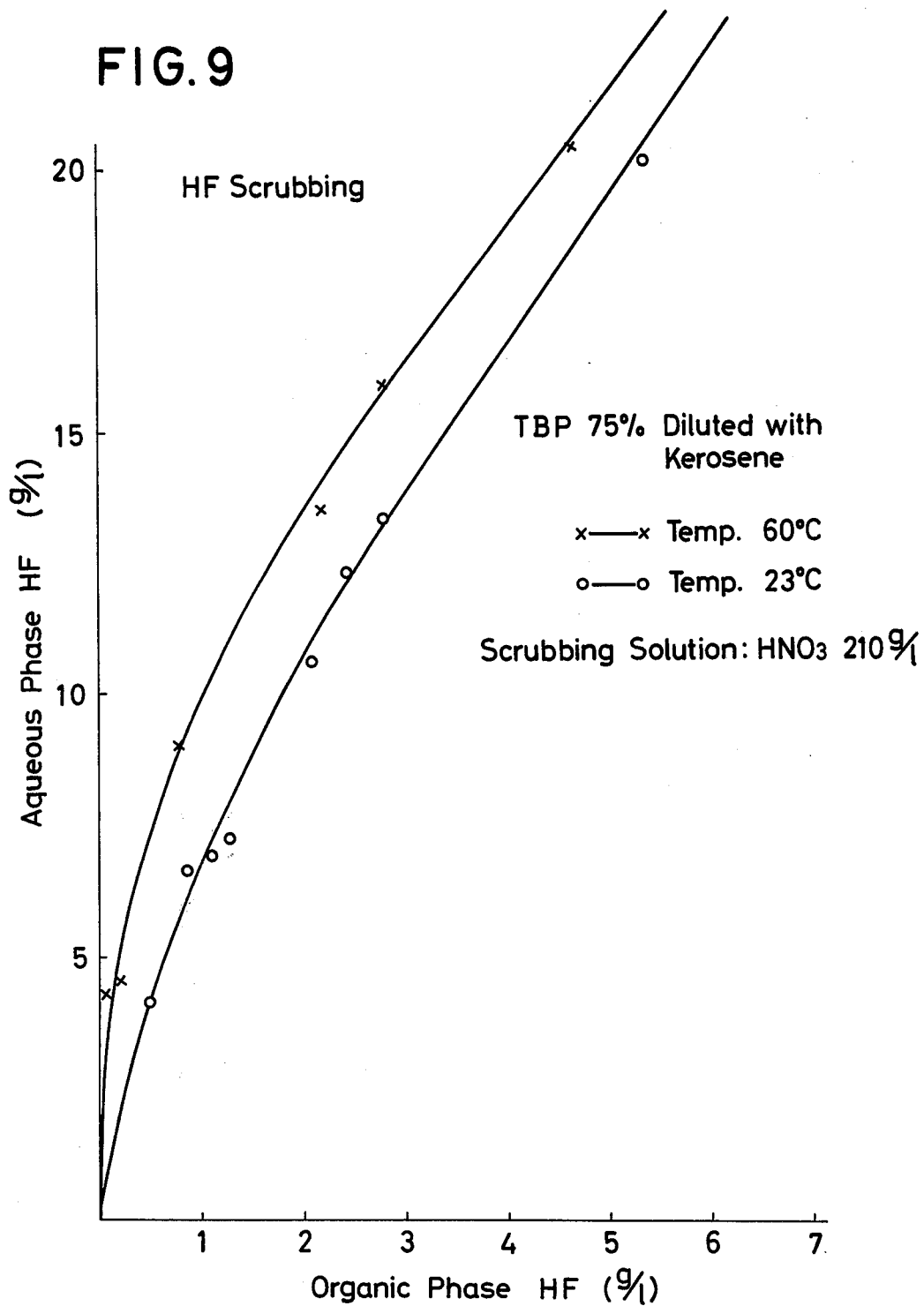
FIG. 9 shows a graph showing HF scrubbing equilibrium curve in the second stage.

FIG. 9 shows that the equilibrium curve lies at a higher position at the higher temperature than at a lower temperature, hence more efficient scrubbing at a higher temperature. Therefore, a higher temperature than 50° C. is preferred, and loss of TBP and TOP by the increased vapor pressure is negligible. The scrubbing solution of HF is a mixture of $HNO_3$ and HF and thus can be passed directly to the mixture acid tank. By repetition of the second step, extraction and scrubbing of $HNO_3$ and HF, consequently only $HNO_3$ having a larger distribution ratio is caught by the organic solvent (B), which is contacted with water to recover $HNO_3$, and then returned to the second stage, while the recovered $HNO_3$ is returned to the acid pickling step.

In the third stage of extraction, the acid waste liquid that comes from the second stage of extraction is brought into contact and mixed with an organic solvent (C) containing phosphoric acid esters such as TBP, TOP, TOPO which form adducts with the mineral acid of concern (ii) to extract desired mineral acids in the organic phase. The organic solvent is then recovered by separation through membrane from the acid waste liquid, and the waste liquid is neutralized, removing the heavy metals such as Ni and Cr in the form of hydroxide, before it is let flow into a discard line.

The mineral acid extracted in the organic phase is separated from some of the co-extracts in the scrubbing stage, and is covered in the stripping stage by being brought into contact and mixed with water and at the same time the organic solvent (C) is regenerated for repeated use for extracting the mineral acid (ii).

The scrubbed solution, if it is repeatedly used in the second extraction stage, where almost all of $HNO_3$ has been extracted, will accumulate HF. Thus HF is separated easily in the third stage of extraction with the organic solvent (C) due to the large extraction distribution coefficient of HF.

Figure 10:
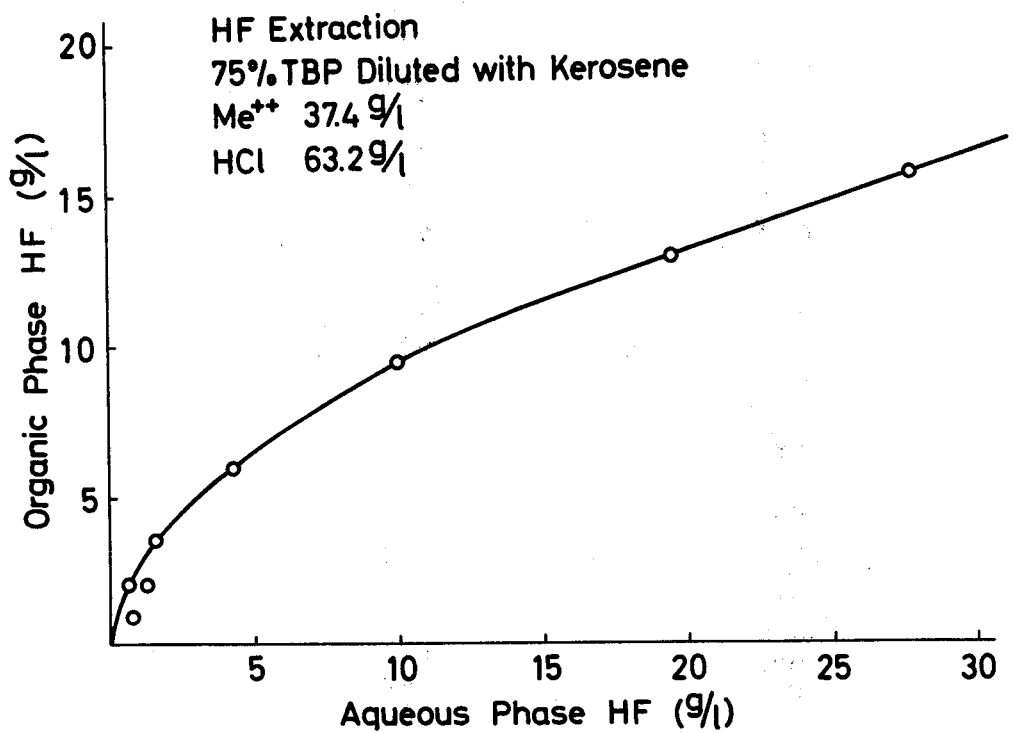
FIG. 10 is a graph showing HF extraction equilibrium curve in the third stage.
Figure 11:
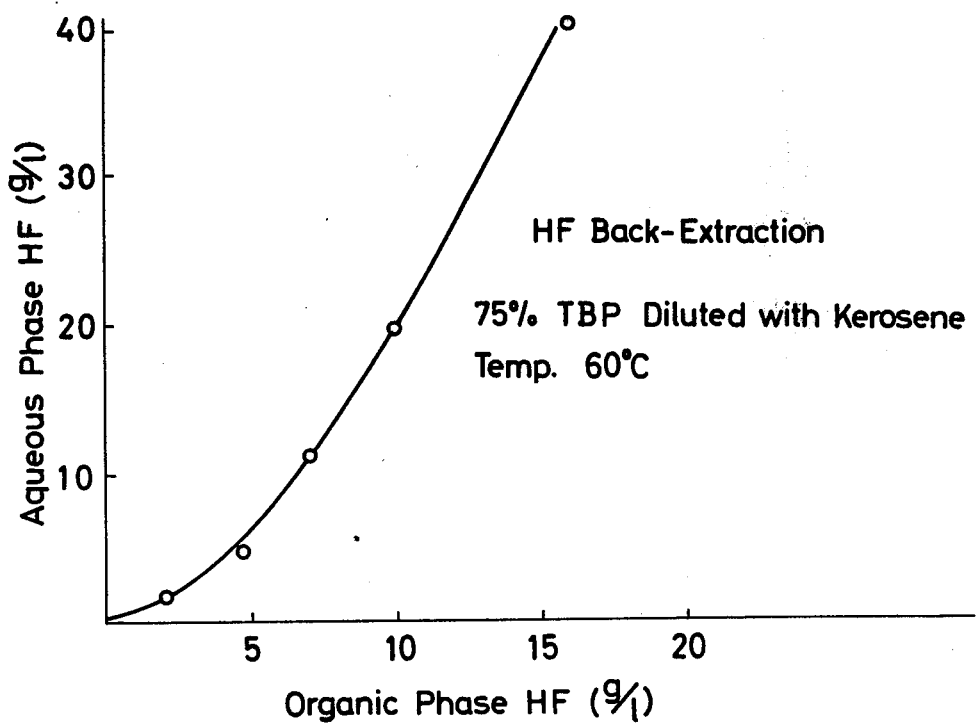
FIG. 11 is a graph showing HF back-extraction equilibrium curve in the third stage.
Figure 14:
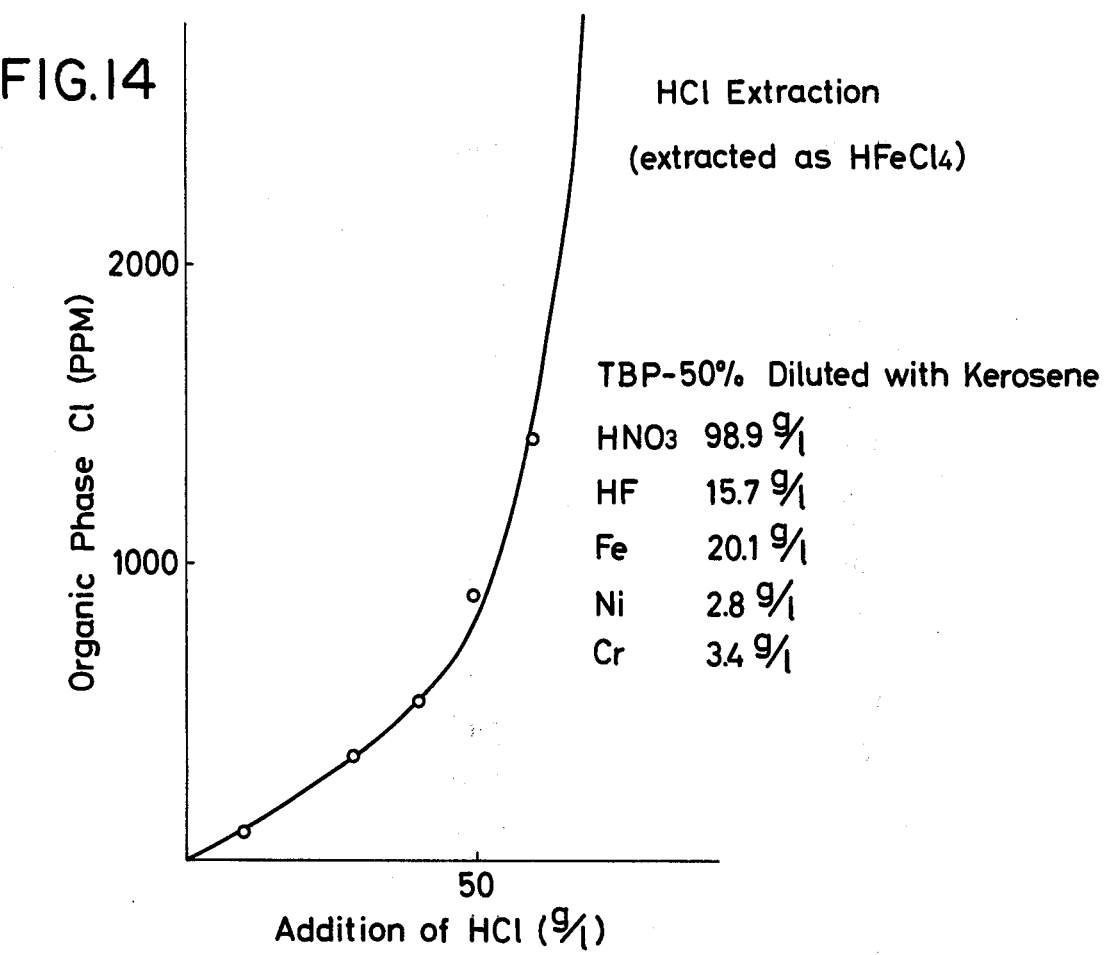
FIG. 14 is a graph showing HCl extraction curve.
Figure 15:
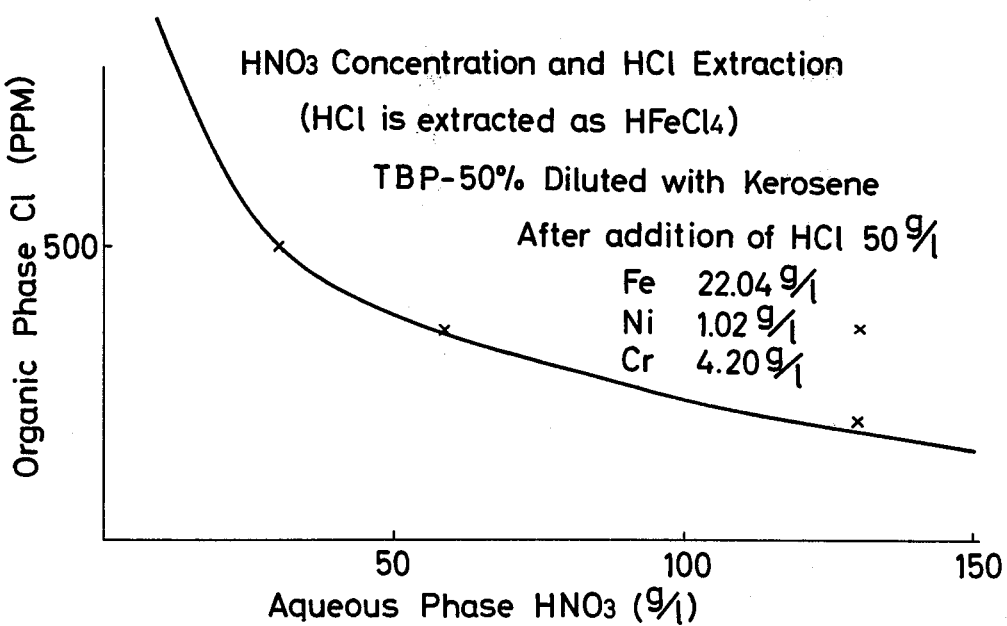
FIG. 15 is a graph showing the relation between $HNO_3$ concentration and HCl extraction.

FIG. 10 shows the extraction equilibrium curve for HF, and FIG. 11 shows the back-extraction equilibrium curve for HF with water. In this way, when HF is extracted, the raffinate is the solution that contains only $MeCl_2$ and this is then transferred to the neutralization stage.

The mechanism of extraction by TBP can be expressed by the following equations:

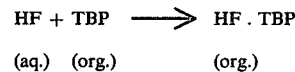

(aq.)    (org.)          (org.)

Stripping

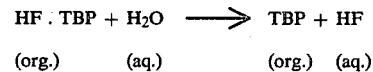

(org.)    (aq.)         (org.)    (aq.)

The extraction is favored by a lower temperature and stripping by a higher temperature.

According to the present invention, the acid waste liquid, before it is brought into contact with the organic solvent (A), is treated by adding oxidizing agents such as $HNO_3$, to convert Fe into $Fe^{3+}$.

On the contact and mixing of the thus pretreated waste liquid with the organic solvent (A) that contains dialkyl phosphoric acid such as $D_2EHPA$ selected for the reaction with Fe ion in the first stage of extraction, the Fe ions in the waste liquid are exchanged by H ions and are separated from the acid waste liquid by being extracted in the organic phase.

In the scrubbing stage, the organic phase containing Fe ions is brought into contact and mixed with a reducing solution (a solution that contains appropriate amounts of NaCl, $Na_2SO_4$, $NaNO_x$, $N_2H_4$ compounds and formic acid and others) to make easy the stripping of the Fe ions and to obtain a concentrated solution of Fe ions, when the organic solvent (A) can be regenerated. The stripping solution is subsequently regenerated by removing the Fe by electrolysis in the next stage.

On the other hand, the acid waste liquid from which Fe ions have been removed contains $HNO_3$ that has been added to convert the valency of Fe. To remove $HNO_3$ from the liquid, this is brought into contact and mixed with an organic solvent (B), in the second extraction stage, containing a phosphoric acid ester that is selected for the reaction with $HNO_3$, when $HNO_3$ forms an adduct and extracted in the organic phase. The acid waste liquid, separated from the organic phase, is regenerated and can be used for further acid washing of metallic materials and articles.

The organic solvent (B) containing $HNO_3$ is brought into contact with water in the stripping stage, to recover $HNO_3$ for further use and regenerate the organic solvent (B) for further repeated extraction of $HNO_3$.

Further, in case when the waste liquid is a $H_2SO_4$ solution containing Fe ion, $Fe^{++}$ is oxidized to $Fe^{3+}$, which is extracted by the organic solvent containing dialkyl phosphoric acid to regenerate $H_2SO_4$ which is returned to the acid pickling step, or further HCl is added in an amount enough to extract Fe ion as chloride complex and by the contact with the organic solvent containing phosphoric acid ester to extract Fe and Cl ions and regenerate $H_2SO_4$. Fe and Cl ions extracted into the organic solvent are brought into contact with water to regenerate the organic solvent to obtain FeCl$_3$ HCl solution of high concentration which is passed to the subsequent HCl recovering step where HCl and Fe or iron oxides are recovered.

For stripping Fe ions extracted in the organic solvent (A), HCl, NaOH or Ca(OH)$_2$ in an aqueous solution is used. When the Fe is in the form of Fe$^{3+}$, it forms FeCl$_3$ which requires one more mol of HCl than FeCl$_2$.

mmH). The mixer was of the pump-suction type and rotated at 180–310 r.p.m. depending on the interface level in the settler using a non-stepwise speed changer.

Acid waste liquid for Test 1:
T.HNO$_3$ 180.4 g/l, T.HF 27.14 g/l, Fe 37.60 g/l, Ni 1.53 g/l, Cr 7.40 g/l.

Acid waste liquid for Test 2:
T.HNO$_3$ 148.1 g/l, T.HF 30.72 g/l, Fe 22.04 g/l, Ni 1.06 g/l, Cr 5.20 g/l

| | | Extraction stage | | | |
|---|---|---|---|---|---|
| | Flow ratio | Inlet | Outlet | | Organic |
| Apparatus | (O/A) | Aq(Fe) | Aq(Fe) | Org(Fe) | solvent |
| 5 Stage mixer-settler | 1.5/1.0 | 37.60 | <0.1 | 24.94 | 50% D$_2$EHPA diluted with kerosene |
| 5 Stage mixer-settler | 1.0/1.0 | 22.04 | <0.1 | 22.02 | |
| (See Fig. 3) | | | | Values in g/l | |

| | | | Scrubbing stage | | | |
|---|---|---|---|---|---|---|
| | | Flow ratio | Inlet | Outlet | | Composition of washing |
| No. | Apparatus | (O/A) | Org(Fe) | Org(Fe) | Aq(Fe) | solution |
| 1 | 5 Stage mixer-settler | 1.0/1.0 | 24.94 | 24.90 | <0.1 | 1.0 mol/l NaCl+0.1 mol/l Na$_2$SO$_3$ |
| 2 | 5 Stage mixer-settler | 1.0/1.0 | 22.02 | 22.02 | <0.1 | 2.0 mol/l NaCl+0.1 mol/l Na$_2$SO$_3$ |
| | | | | | Values in g/l | |

| | | Stripping stage (Back-extraction) | | | | |
|---|---|---|---|---|---|---|
| | | Flow ratio | Inlet | Outlet | | Stripping |
| No. | Apparatus | (O/A) | Org(Fe) | Org(Fe) | Aq(Fe) | solution |
| 1 | 10 Stage mixer-settler | 1.0/2.5 | 24.94 | 0.8 | 9.64 | 15% HCl |
| 2 | 10 Stage mixer-settler (see Fig. 4) | 1.0/2.0 | 22.02 | <0.1 | 11.00 | 15% HCl |
| | | | | Values in g/l | | |

Formation of Fe(OH)$_3$ by reaction with NaOH or Ca(OH)$_2$ may introduce some troubles due to formation of the third phase by Fe(OH)$_3$.

In the extraction, only Fe$^{3+}$ can be extracted under a strongly acid, but the back-extraction in the stripping step is more easily performed when Fe$^{3+}$ is reduced to Fe$^{2+}$, and a back-extraction solution containing highly concentrated Fe ion can be obtained.

Thus, in the scrubbing step prior to the back-extraction of Fe ion, the solution is brought into contact with the scrubbing solution such as 2 M NaCl solution. 2 M NaCl+1 M Na$_2$SO$_3$ solution, NaCl+NaNO$_2$ solution and a solution containing small amount of N$_2$H$_4$ so as to make it easier to strip Fe ion from the organic phase, and by contact with 15% HCl solution in the stripping stage, it is possible to obtain a back-extraction solution containing highly concentrated Fe ion.

Further, by incorporating an electrolysis step in the back-extraction circuit, it is possible to remove Fe ion from the back-extraction solution as metallic iron or iron oxides and to regenerate HCl in a closed circuit.

EXAMPLES:

(1) The First Stage

Two acid waste liquids shown below which had been used for acid pickling of stainless steel were continuously treated with an organic solvent containing D$_2$EHPA at the flow rate of 0.15 l/min. to remove Fe using a mixer settler (100 mmW×500 mmL×150

(2) The second stage (Extraction and Separation of HNO$_3$ and HF)

Variations of the extraction distribution ratio of HNO$_3$ and of HF are shown for two cases; in one case such an amount of HCl that was equivalent to the total of the metal ions contained was added to the acid waste liquid from which Fe ion had been extracted to adjust the H ion concentration and convert the chemical species; and in the other case, without previous extraction of Fe ion, HCl in the amount equivalent to that of total heavy metals dissolved (the same amount of HCl as was equivalent to the Fe ion was required in addition to the amount needed in the former case) was added to the same acid waste liquid.

A test was conducted using a 15 stage mixer settler. Analytical results for each stage are shown in the following table. As is apparent in the table, removing the Fe ion prior to the extraction of HNO$_3$ and HF, thus increasing the distribution coefficient of HNO$_3$ and HF is effective to improve the recovery of HF because F ion that has been combined with Fe is liberated in the form of HF.

The most part of Ni and Cr ions are found to be in the forms of NiCl$_2$ and CrCl$_3$, respectively by combining with the added HCl. This demonstrates the usefulness of removing Fe ions prior to the extraction of HNO$_3$ and HF. In addition, because of the nearly complete extraction and recovery of HF, the amount of CaF$_2$ (sludge) formed in the subsequent neutralization stage is diminished, evolution of F gas is avoided which may take place in treating sludges. The sludges consist of only metal hydroxides and can obtain the high quality grade of valuable metals in them. A further merit is that the economical recovery cost of Ni, Cr and Mo by smelting can be obtained from the sludges not including Fe.

and HCl was added to the concentration 19.7 g/l. It contained 0.04 g/l of Fe, 5.20 g/l of Ni and 4.50 g/l of Cr, and the ratio HCl/Fe=19.7/0.04=492.

A continuous test was done for the second step as under.

The waste liquid from which Fe ion was extracted in the first step and in which HCl was added was used for the test. The composition of the liquid is:

| Stage No. | Comparison of extraction of $HNO_3$ and HF | | | | | | | |
|---|---|---|---|---|---|---|---|---|
| | Inlet | 1 | 2 | 3 | 4 | 5 | 6 | |
| (1) Acid waste liquid without extraction of Fe | $HNO_3$ | 146.7 | 115.6 | 85.4 | 78.7 | 57.8 | 35.6 | 25.7 |
| | HF | 31.7 | 30.7 | 29.1 | 28.3 | 24.9 | 24.5 | 23.7 |
| (2) Acid waste liquid with prior extration of Fe | $HNO_3$ | 225.0 | 155.0 | 103.2 | 72.3 | 43.5 | 24.6 | 11.4 |
| | HF | 30.72 | 28.4 | 25.8 | 22.5 | 20.1 | 18.1 | 16.7 |

| | | 7 | 8 | 9 | 10 | 11 | 12 | 13 | 14 | 15 |
|---|---|---|---|---|---|---|---|---|---|---|
| (1) | $HNO_3$ | 20.1 | 16.9 | 8.1 | 4.3 | 1.3 | 0.8 | 0.5 | 0.4 | tr |
| | HF | 22.6 | 21.1 | 18.5 | 18.0 | 17.5 | 15.3 | 14.9 | 13.9 | 13.8 |
| (2) | $HNO_3$ | 8.0 | 3.9 | 0.5 | 0.4 | none | none | none | none | tr |
| | HF | 12.4 | 10.1 | 6.32 | 5.0 | 3.44 | 2.00 | 1.16 | 0.41 | 0.1 |

Values in g/l

| $HNO_3$ | HF | Fe | Ni | Cr | HCl |
|---|---|---|---|---|---|
| 146.7 g/l | 21.7 g/l | 0.008 g/l | 1.56 g/l | 4.34 g/l | 20.33 g/l |

| | | Extraction of $HNO_3$ | | | | | | |
|---|---|---|---|---|---|---|---|---|
| Apparatus | Flow ratio (C/A) | Inlet (Aq) | | Outlet (Aq) | | Outlet (Org) | | Solvent |
| | | $HNO_3$ | HF | $HNO_3$ | HF | $HNO_3$ | HF | |
| 15 Stage mixer-settler | 3.0/1.0 | 146.7 | 21.7 | <0.2 | 0.4 | 48.8 | 7.05 | 75% TBP+ TOP diluted with kerosene |

Figure 16:
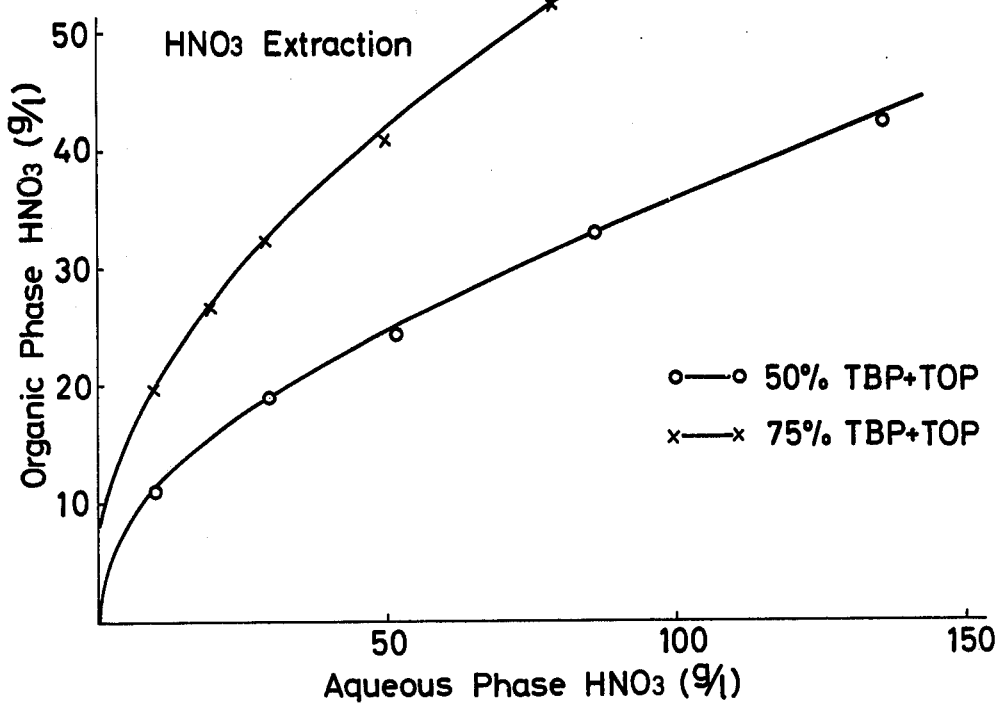
FIG. 16 is a graph showing $HNO_3$ extraction in the second stage.

(See Fig. 16) Values in g/l

| | | Scrubbing of HF | | | | | | | |
|---|---|---|---|---|---|---|---|---|---|
| Apparatus | Flow ratio (O/A) | Inlet(Org) | | Inlet (Aq) | | Outlet(Org) | | Outlet(Aq) | |
| | | $HNO_3$ | HF | $HNO_3$ | HF | $HNO_3$ | HF | $HNO_3$ | HF |
| 15 Stage mixer-settler | 3.5/1.0 | 48.8 | 7.05 | 240.0 | 0 | 72.6 | ≦0.01 | 156.7 | 24.75 |

(See Fig. 9) Values in g/l Temperature: 60° C.

Remark:

The acid waste liquid (1) was an acid washing solution for stainless steel to which HCl was added to the concentration 69.6 g/l. It contained 38.2 g/l of Fe, 2.9 g/l of Ni and 4.3 g/l of Cr and the ratio HCl/Fe=69.6/38.2=1.82.

The acid waste liquid (2) was the same acid washing solution from which Fe ion was removed by extraction Remarks:

(i) "Outlet (Aq)" may be reused as recovered mixed acid.

(ii) When $HNO_3$ and HF are fractionally recovered, "Outlet (Aq)" is returned repeatedly to extraction treatment so as to extract only $HNO_3$.

(iii) Only $HNO_3$ is extracted in the organic phase after the scrubbing.

| | | Stripping of $HNO_3$ | | | | | | |
|---|---|---|---|---|---|---|---|---|
| Apparatus | Flow ratio (O/A) | Inlet(Org) | | Outlet(Org) | | Outlet(aq) | | Temperature on stripping |
| | | $HNO_3$ | HF | $HNO_3$ | HF | $HNO_3$ | HF | |
| 15 Stage mixer-settler | 3.0/1.0 | 72.6 | <0.01 | 1.8 | <0.01 | 217.1 | <0.01 | 60° C. |

Figure 17:
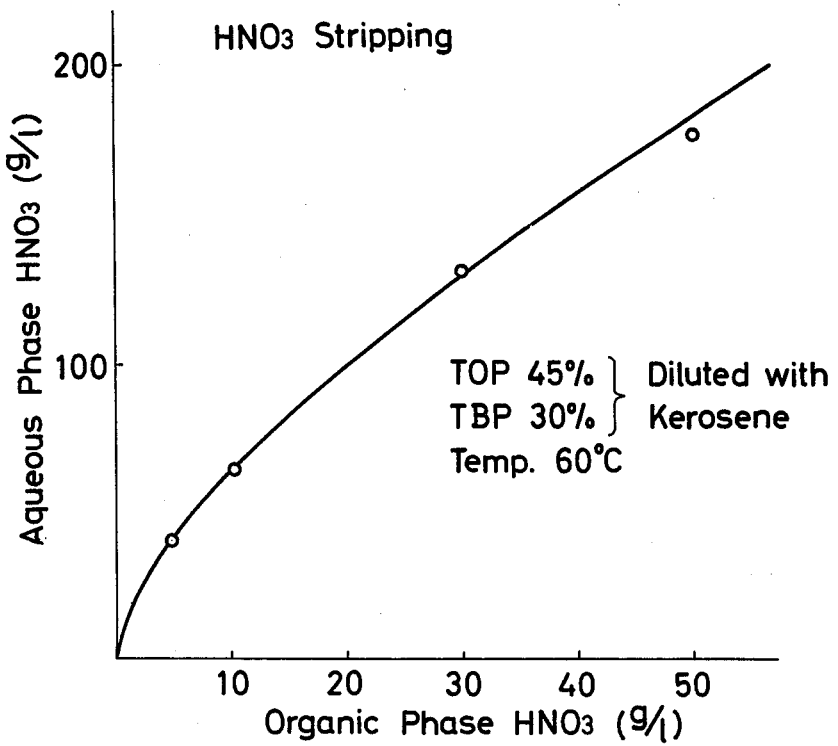
FIG. 17 is a graph showing $HNO_3$ stripping in the second stage.

(See Fig. 17) Values in g/l (3) The Third Stage (Extraction and Stripping of HF)

When the acid mixture from the scrubbing stage is repeatedly returned to the second extraction stage, the following liquid is produced.

| HNO₃ | HF | HCl | Fe | Ni | Cr |
|---|---|---|---|---|---|
| 0.4 g/l | 22.6 g/l | 21.8 g/l | 0.008 g/l | 1.56 g/l | 4.34 g/l |

HF Extraction stage

| Apparatus | Flow ratio (O/A) | Inlet(Aq) HNO₃ | HF | Outlet(Aq) HNO₃ | HF | Outlet(Org) HNO₃ | HF | Solvent |
|---|---|---|---|---|---|---|---|---|
| 15 Stage mixer-settler | 1.0/1.0 | 0.4 | 22.6 | ≦0.01 | ≦0.01 | 0.4 | 22.5 | 60% TOP diluted with kerosene |

(See FIG. 10)     Values in g/l

HNO₃ Scrubbing stage

| Apparatus | Flow ratio (O/A) | Inlet(Org) HNO₃ | HF | Outlet(Org) HNO₃ | HF | Outlet(Aq) HNO₃ | HF | Solvent |
|---|---|---|---|---|---|---|---|---|
| 5 Stage mixer-settler | 5.0/1.0 | 0.4 | 22.5 | ≦0.01 | 20.06 | 2.10 | 9.5 | 25° C. water |

Values in g/l

HF Stripping stage

| Apparatus | Flow ratio (O/A) | Inlet(Org) HNO₃ | HF | Outlet(Org) HNO₃ | HF | Outlet(Aq) HNO₃ | HF | Solvent |
|---|---|---|---|---|---|---|---|---|
| 20 Stage mixer-settler | 2.0/1.0 | ≦0.1 | 20.06 | ≦0.1 | 1.7 | <0.01 | 36.7 | 60° C. water |

(See FIG. 11)     Values in g/l (4) The Fourth Stage

The waste liquid from which Fe ion had been back-extracted in the first step was brought into contact with the organic solvent (D) containing phosphoric acid ester such as TBP so as to concentrate Fe ion.

The composition of the liquid is
HCl 151.2 g/l
Fe 11.0 g/l

The extraction is performed according to the formula

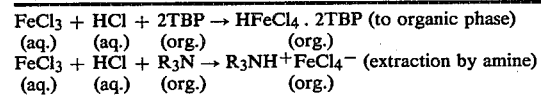

FeCl₃ + HCl + 2TBP → HFeCl₄ . 2TBP (to organic phase)
(aq.)   (aq.)   (org.)     (org.)
FeCl₃ + HCl + R₃N → R₃NH⁺FeCl₄⁻ (extraction by amine)
(aq.)   (aq.)   (org.)     (org.)

Fe Extraction

| Apparatus | Flow ratio (O/A) | Inlet(Aq) HCl | Fe | Outlet(Aq)* HCl | Fe | Outlet(Org) HCl | Fe |
|---|---|---|---|---|---|---|---|
| 5 Stage mixer-settler | 1.5/1.0 | 151.2 | 11.0 | 122.8 | 0.01 | 18.8 | 7.3 |

Figure 5:
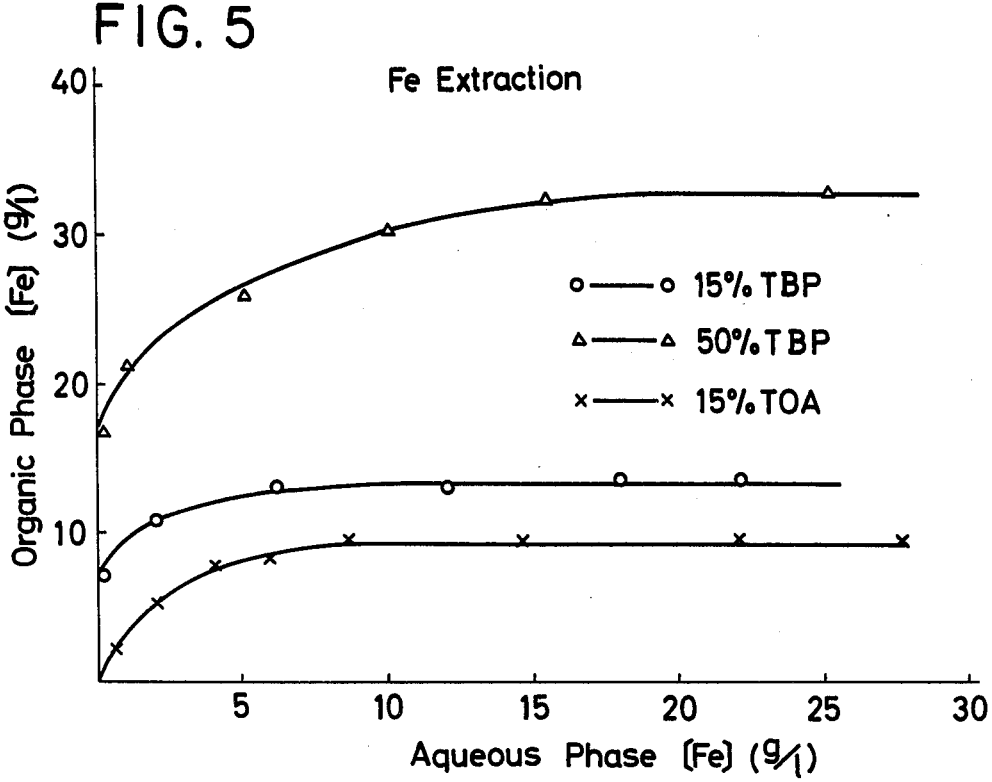
FIG. 5 is a graph showing Fe extraction equilibrium curve in the fourth stage.

15% TBP diluted with kerosene(See FIG. 5)    Values in g/l

*The outlet (Aq) after addition of HCl is returned to the first step and used for regeneration of the organic solvent (A).

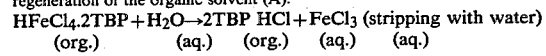

HFeCl₄.2TBP+H₂O→2TBP HCl+FeCl₃ (stripping with water)
(org.)    (aq.)   (org.)   (aq.)   (aq.)

Stripping

Flow

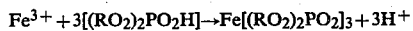

| Apparatus | ratio (O/A) | Inlet(Org) HCl | Fe | Outlet(Org) HCl | Fe | Outlet(Aq) HCl | Fe |
|---|---|---|---|---|---|---|---|
| 10 Stage mixer-settler | 7.5/1.0 | 18.8 | 7.3 | 0.4 | ≦0.1 | 138.0 | 54.8 |

Figure 6:
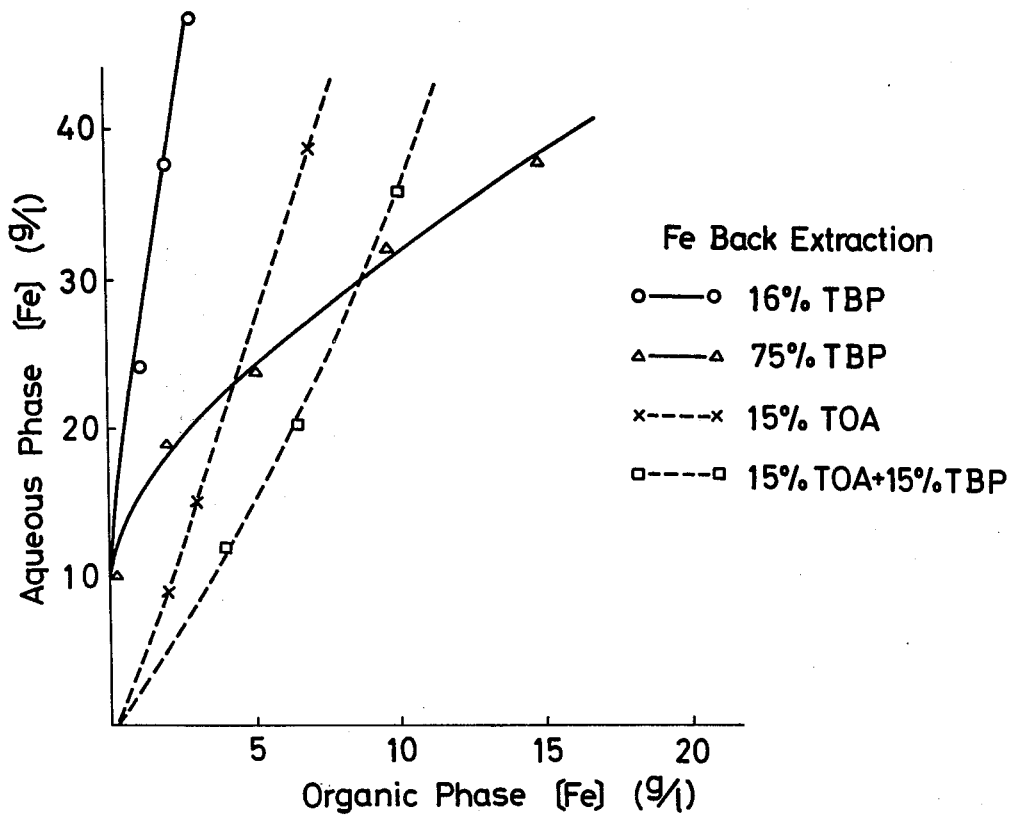
FIG. 6 shows a graph showing Fe back-extraction equilibrium curve in the fourth stage.

(See FIG. 6)    Values in g/l, Temperature 60° C.

The outlet (Aq), when has increased concentration of HCl and Fe, is introduced to the HCl recovery step where electrolytic iron or iron oxides and HCl are recovered economically. The iron oxides have a high degree of purity so that they can be used for production of high-grade iron oxides such as ferrite.

(5) Regeneration of Sulfuric Acid

The waste liquid (1) which has been used for acid pickling of steel materials and contains 3.17 mol/l H₂SO₄, 59.4 g/l Fe ion and the waste liquid (2) containing 1.19 mol/l H₂SO₄, 59.4 g/l Fe ion are used for extraction of Fe ion and regeneration of H₂SO₄.

Before the extraction, 40% HNO₃ is added in a ratio of 0.1 l HNO₃/1l of waste liquid to convert Fe²⁺ ion into Fe³⁺ ion, and the liquid is brought into contact with an organic solvent containing dialkyl phosphoric acid such as D₂EHPA to extract Fe ion according to the formula Fe³⁺ + 3[(RO₂)₂PO₂H]→Fe[(RO₂)₂PO₂]₃+3H⁺

The test was continuously done using a mixer-settler of 100 m/m width, 500 m/m length and 150 m/m height. The mixer is of the pump-suction type and adjusted to 180 to 310 r.p.m.

Fe Extraction

| Apparatus | Flow ratio (O/A) | Inlet(Aq) Fe | H₂SO₄ | Outlet(Aq) Fe | H₂SO₄ | Outlet(Org) Fe | H₂SO₄ |
|---|---|---|---|---|---|---|---|
| (1) 10 Stage | | | | | | | |

-continued

| | Flow ratio | Fe Extraction Inlet(Aq) | | Outlet(Aq) | | Outlet(Org) | |
|---|---|---|---|---|---|---|---|
| Apparatus | (O/A) | Fe | $H_2SO_4$ | Fe | $H_2SO_4$ | Fe | $H_2SO_4$ |
| mixer-settler 2 (10) | 3.0/1.0 | 54.0 | 288.2 | ≦0.1 | 288.2 | 18.0 | — |
| Stage-mixer-settler | 3.0/1.0 | 54.0 | 105.8 | ≦0.01 | 105.8 | 18.1 | — |
| 50% $D_2EHPA$ diluted with kerosene | | | | Values in g/l | | | |

Fe ion extracted into the organic phase is converted into chloride which is easier to recover, thus eliminating that danger of public pollution. The chloride is introduced to the electrolysis step or the thermal decomposition step to obtain HCl and metallic iron or iron oxide.

The stripping is done by the formula $$Fe[(RO_2)_2PO_2]_3 + 3HCl \rightarrow 3[(RO_2)_2POOH] + FeCl_3$$
$$\text{(org.)} \quad \text{(aq.)} \quad \text{(org.)} \quad \text{(aq.)}$$

| | | Stripping | | | | | |
|---|---|---|---|---|---|---|---|
| | Flow ratio | Inlet(Org) | | Outlet(Org) | | Outlet(Aq) | |
| Apparatus | (O/A) | Fe | $H_2SO_4$ | Fe | HCl | Fe | HCl |
| (1) 10 Stage mixer-settler | 1.5/1.0 | 18.0 | — | ≦0.1 | — | 27.0 | 150.3 |
| (2) 10 Stage mixer-settler | 1.5/1.0 | 18.0 | — | ≦0.1 | — | 27.1 | 150.3 |
| (See FIG. 4) | | Values in g/l, Temperature 20° C. | | | | | |

Better results were obtained at relatively low temperatures.

After the extraction of Fe ion, $HNO_3$ was extracted using the organic solvent containing phosphoric acid ester such as TBP.

| | | Extraction of $HNO_3$ | | | | | |
|---|---|---|---|---|---|---|---|
| | Flow ratio | Inlet(Aq) | | Outlet(Aq) | | Outlet(Org) | |
| Apparatus | (O/A) | $HNO_3$ | $H_2SO_4$ | $HNO_3$ | $H_2SO_4$ | $HNO_3$ | $H_2SO_4$ |
| (1) 10 Stage mixer-settler | 1.0/1.0 | 36.7 | 288.2 | ≦0.1 | 288.1 | 36.2 | ≦0.1 |
| (2) 10 Stage mixer-settler | 1.0/1.0 | 36.1 | 105.8 | ≦0.1 | 105.8 | 36.0 | ≦0.1 |
| 50% TBP diluted with kerosene | | | | Values in g/l | | | |

| | | Stripping | | | | | |
|---|---|---|---|---|---|---|---|
| | Flow ratio | Inlet(Org) | | Outlet(Org) | | Outlet(Aq) | |
| Apparatus | (O/A) | $HNO_3$ | $H_2SO_4$ | $HNO_3$ | $H_2SO_4$ | $HNO_3$ | $H_2SO_4$ |
| 15 Stage mixer-settler | 3.5/1.0 | 36.2 | — | 2.5 | — | 117.9 | — |
| Temperature 65° C. | | | | Values in g/l | | | |

After the oxidation of Fe ion, HCl is added in an amount enough to extract Fe as a chloride complex, thus obtaining a waste liquid (3) of 160.9 g/l $H_2SO_4$, 41.1 g/l Fe and 106.0 g/l HCl, and waste liquid (4) of 42.8 g/l Fe and 110.5 g/l HCl which is brought into contact with the organic solvent containing phosphoric acid ester to extract the added HCl and Fe ion and regenerate $H_2SO_4$ according to the formula $$1/2\ Fe_2(SO_4)_3 + 4HCl + 2TBP \rightarrow HFeCl_4 \cdot 2TBP + 3/2\ H_2SO_4$$
$$\text{(aq.)} \quad \text{(aq.)} \quad \text{(org.)} \quad \text{(org.)} \quad \text{(aq.)}$$

| | | Extraction | | | | | |
|---|---|---|---|---|---|---|---|
| | Flow ratio | Inlet (Aq) | | Outlet (Aq) | | Outlet (Org) | |
| Apparatus | (O/A) | Fe | $H_2SO_4$ | Fe | $H_2SO_4$ | Fe | HCl |
| (3) 15 Stage mixer-settler | 3.5/1.0 | 41.1 | 160.9 | ≦0.1 | 184.9 | 11.7 | 30 |
| (4) 15 Stage mixer-settler | 4.0/1.0 | 42.8 | 215.5 | ≦0.1 | 247.7 | 10.7 | 27.6 |
| (See Fig. 13) 15% TBP diluted with kerosene | | | | | | Values in g/l | |

The stripping is done by the formula;

$$HFeCl_4 \cdot 2TBP + H_2O \rightarrow 2TBP + FeCl_3 + HCl$$
$$\text{(org.)} \quad \text{(aq.)} \quad \text{(org.)} \quad \text{(aq.)} \quad \text{(aq.)}$$

$$R_3NH^+ \cdot FeCl_4^- + H_2O \rightarrow R_3N + FeCl_3 + HCl$$
$$\text{(org.)} \quad \text{(aq.)} \quad \text{(org.)} \quad \text{(aw.)} \quad \text{(aq.)}$$

| | | Stripping | | | | | |
|---|---|---|---|---|---|---|---|
| | Flow ratio | Inlet (Org) | | Outlet (Aq) | | Outlet (Aq) | |
| Apparatus | (O/A) | Fe | HCl | Fe | HCl | Fe | HCl |
| (3) 10 Stage mixer-settler | 7.0/1.0 | 11.7 | 30.2 | 0.09 | 0.23 | 81.3 | 210.0 |
| (4) 10 Stage mixer- | 6.0/1.0 | 10.7 | 27.6 | 0.07 | 0.18 | 63.8 | 164.4 |

-continued

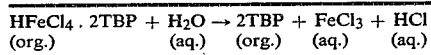
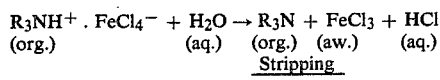

| Apparatus | Flow ratio (O/A) | Inlet (Org) Fe HCl | Outlet (Aq) Fe HCl | Outlet (Aq) Fe HCl |
|---|---|---|---|---|
| settler | | | | |

(See FIG. 6)
(3) Temperature 60° C.;
(4) Temperature 40° C.,
Values in g/l

| Comparison of achievements of the present invention with those of Japanese Patent Application Laid-open Specification Sho 48-83097 | |
|---|---|
| Sho 48-83097 | Present invention |
| (i) Low recovery of HF | Almost complete recovery of HF |
| (ii) $H_2SO_4$ is added. | HCl is added |
| (iii) High cost in neutralization and much sludge | Low cost in neutralization and little sludge |
| (iv) Fractional recovery is not intended | Fractional recovery is intended |
| (v) Fractional recovery of metals impossible | Fractional recovery of metals possible |
| (vi) High cost for recovering metals | Low cost for recovering metals |
| (vii) Much acid required for converting form of chemical species and adjusting hydrogen ion concentration | Little acid required because HCl for stripping Fe can be recovered |
| (viii) Secondary pollution and corrosion of apparatus by F gas evolved on remelting metals. | Secondary pollution less apprehended because less $CaF_2$ formed. |
| (ix) High total running cost | Low running cost |
| (x) Nearly 100% recovery of $HNO_3$ | Nearly 100% |
| (xi) Recovery of waste acids except monovalent inorganic acids impossible | Recovery of mixtures of $H_2SO_4$; $H_3PO_4$ and $H_2Cr_2O_7$ besides monovalent inorganic acids possible |
| (xii) High recovery cost of metals in sludge | Low recovery cost of metals in sludge |
| (xiii) Recovery of reuseful acids impossible, if HCl or $H_2Cr_2O_7$ is in the acid waste liquid | Recovery of the corresponding reuseful acids possible, even if mixed acids are in the acid waste liquid |

What is claimed is:

1. A method for treating an acid waste liquid containing Fe(III) ions, $HNO_3$ and HF which has been used for acid washing of metallic materials or articles which comprises:
    (a) extracting Fe(III) ions from the waste liquid with a first organic solvent selected from the group consisting of di-(2-ethyl-hexyl) phosphoric acid, monododecyl phosphoric acid and mixtures thereof in an organic solvent;
    (b) adding hydrochloric acid to the extracted waste liquid from step (a) in an amount sufficient to convert any remaining heavy metal ions therein to chlorides;
    (c) extracting the resulting waste liquid from step (b) with a second organic solvent containing a phosphoric acid ester, a primary, secondary or tertiary amine or a quaternary ammonium chloride which form adducts with $HNO_3$ and HF in an organic phase;
    (d) extracting the resulting waste liquid from step (c) with a third organic solvent containing phosphoric acid esters which form adducts with HF and $HNO_3$ to recover any remaining mineral acids therein; and
    (e) regenerating each of the first, second and third solvents in respective stages.

2. The process of claim 1 wherein after the extraction in step (a), the first organic solvent is scrubbed with a solution of a reducing agent and the thus scrubbed first organic solvent is stripped with an HCl stripping solution and the stripping solution is then contacted with a fourth organic solvent containing compounds selected from the group consisting of phosphoric acid esters, primary, secondary, tertiary, and quaternary amines which form water soluble complexes of the Fe(III).

3. A method for treating an acid waste liquid containing Fe(III) ions, $HNO_3$ and HF which has been used for acid washing of metallic materials or articles which comprises:
    (a) extracting Fe(III) ions from the waste liquid with a first organic solvent selected from the group consisting of alkyl phosphoric acids in an organic solvent;
    (b) adding HCl or $H_2SO_4$ to the extracted waste liquid from step (a) in an amount sufficient to convert any remaining heavy metal ions therein to chlorides or sulfates;
    (c) extracting the resulting waste liquid from step (b) with a second organic solvent containing a phosphoric acid ester, a primary, secondary or tertiary amine or a quaternary ammonium chloride which form adducts with $HNO_3$ and HF in an organic phase;
    (d) extracting the resulting waste liquid from step (c) with a third organic solvent containing phosphoric acid esters which form adducts with HF and $HNO_3$ to recover any remaining mineral acids therein; and
    (e) regenerating each of the first, second and third solvents in respective stages.

4. The process of claim 3 wherein after the extraction in step (a), the first organic solvent is scrubbed with a solution of a reducing agent and the thus scrubbed first organic solvent is stripped with an HCl stripping solution and the stripping solution is then contacted with a fourth organic solvent containing compounds selected from the group consisting of phosphoric acid esters, primary, secondary, tertiary, and quaternary amines which form water soluble complexes of the Fe(III).

5. A method for treating an acid waste liquid containing Fe(III) ions, $HNO_3$ and HF which has been used for acid washing of metallic materials or articles which comprises:
   (a) extracting Fe (III) ions from the waste liquid with a first organic solvent (A) which contains one or more compounds selected from the group of alkyl phosphoric acids, together with a hydrocarbon as diluent;
   (b) regenerating the used solvent (A) with HCl;
   (c) adding HCl or $H_2SO_4$ to the extracted waste liquid from step (a) in an at least stoichiometric amount to convert any remaining heavy metal ions therein to chlorides or sulfates;
   (d) extracting the resulting waste liquid from step (c) with a second organic solvent (B), which contains one or more compounds selected from the group of alkyl phosphoric acid esters, together with a hydrocarbon as diluent to recover $HNO_3$ and HF in an organic phase;
   (e) regenerating the organic solvent (B) and recovering $HNO_3$ and HF by stripping the organic phase with water.

6. The method of claim 5 wherein the HCl from step (b) is extracted with a further organic solvent (D) which contains one or more compounds selected from the group of alkyl phosphoric acid ester or high molecular weight amine and then regenerating solvent (D) whereby the recovery of Fe and HCl is facilitated due to the concentrated ferric chloride solution obtained with the regeneration of the organic solvent (D).

7. A method for treating an acid waste liquid containing Fe(III) ions, $HNO_3$ and HF which has been used for acid washing of metallic materials or articles which comprises:
   (a) extracting Fe (III) ions from the waste liquid with a first organic solvent (A) which contains one or more compounds selected from the group of alkyl phosphoric acids, together with a hydrocarbon as diluent;
   (b) regenerating the used solvent (A) with HCl;
   (c) adding HCl or $H_2SO_4$ to the extracted waste liquid from step (a) in an at least stoichiometric amount to convert any remaining heavy metal ions therein to chlorides or sulfates;
   (d) extracting the resulting waste liquid from step (c) with a second organic solvent (B) which contains one or more compounds selected from the group of alkyl phosphoric acid esters, together with a hydrocarbon as diluent to recover $HNO_3$ and HF in an organic phase;
   (e) scrubbing organic solvent (B) which contains co-extracted $HNO_3$ and HF by contacting it with a $HNO_3$ solution whereby the $HNO_3$ has a larger distribution coefficient than HF to recover organic solvent (B) containing only $HNO_3$ and then regenerating solvent (B) by stripping it with water.

8. The method of claim 7 wherein the scrubbing treatment of step (e) is repeated at least once.

9. The method of claim 7 wherein the waste liquid from step (d) is contacted with a third organic solvent (C) which contains one or more compounds selected from the group of alkyl phosphoric acid ester or high molecular weight amine together with a hydrocarbon as diluent to extract any remaining HF and then regenerating organic solvent (C).

* * * * *